(12) United States Patent
Varney et al.

(10) Patent No.: US 7,787,443 B2
(45) Date of Patent: Aug. 31, 2010

(54) METHOD AND APPARATUS FOR ALLOWING PEERING RELATIONSHIPS BETWEEN TELECOMMUNICATIONS NETWORKS

(75) Inventors: Douglas W. Varney, Naperville, IL (US); Guy J. Zenner, Northbrook, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1370 days.

(21) Appl. No.: 11/240,700

(22) Filed: Sep. 30, 2005

(65) Prior Publication Data

US 2007/0076691 A1 Apr. 5, 2007

(51) Int. Cl.
*H04L 12/66* (2006.01)
(52) U.S. Cl. .................... 370/352; 370/503
(58) Field of Classification Search .......... None
See application file for complete search history.

(56) References Cited

U.S. PATENT DOCUMENTS

| 6,950,650 B2 * | 9/2005 | Roeder ................. 455/417 |
| 2006/0043164 A1 * | 3/2006 | Dowling et al. ........ 235/375 |
| 2006/0079236 A1 * | 4/2006 | Del Pino et al. ....... 455/445 |

* cited by examiner

*Primary Examiner*—Duc C Ho
(74) *Attorney, Agent, or Firm*—Fay Sharpe LLP

(57) ABSTRACT

A method for provisioning a peering relationship between the multimedia networks in a telecommunications system. The method comprises registering a customer with at least one of the multimedia networks; constructing the customer's mapping and routing data (including initial filter criteria) within each of the networks; synchronizing the customer's mapping and routing data between the multimedia networks; and storing the customer's mapping and routing data in a database in each of the multimedia networks. Further, the method results in network selection using the customer's mapping and routing data.

15 Claims, 6 Drawing Sheets

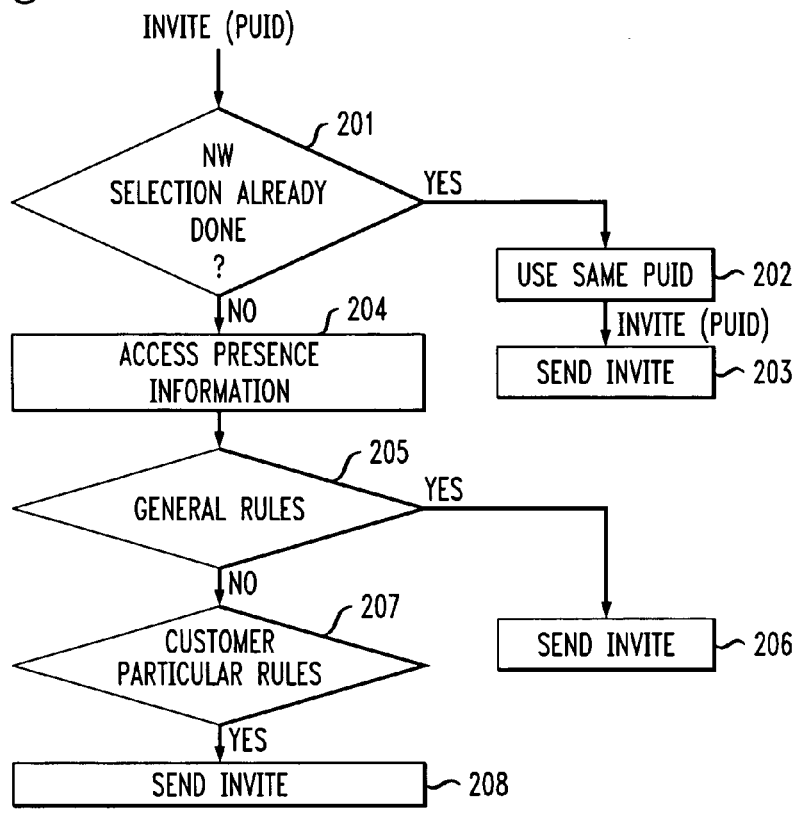
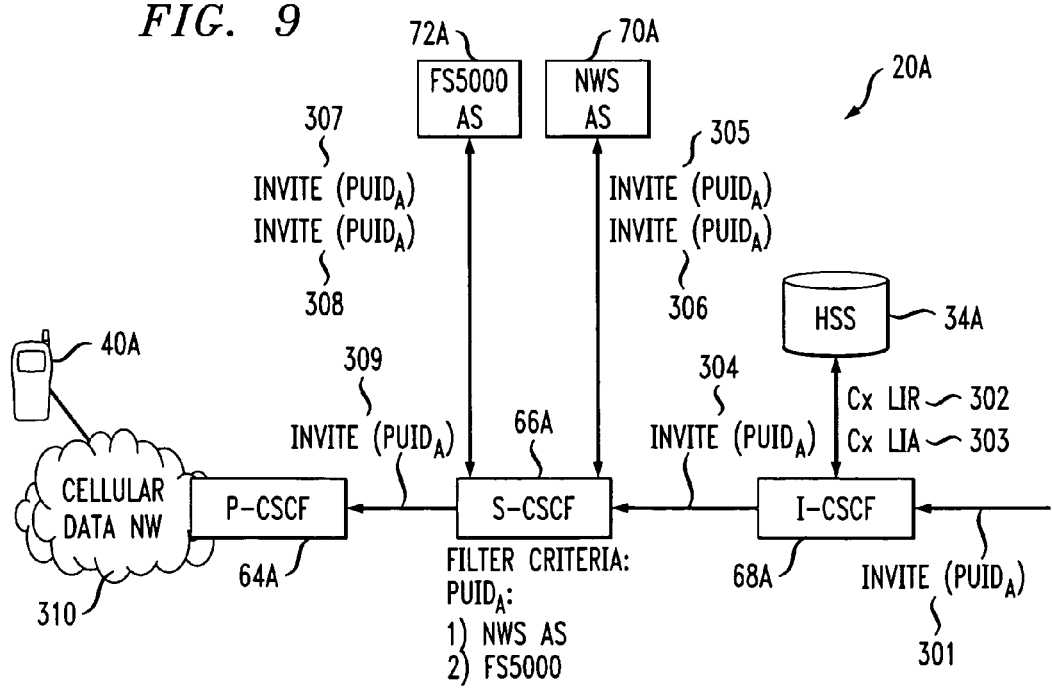

METHOD AND APPARATUS FOR ALLOWING PEERING RELATIONSHIPS BETWEEN TELECOMMUNICATIONS NETWORKS

BACKGROUND OF THE INVENTION

This invention relates to a method and system for allowing peering relationships between telecommunications networks. While the invention is particularly directed to the art of telecommunications and multimedia networks such as the IP multimedia subsystem (IMS), and will be thus described with specific reference thereto, it will be appreciated that the invention may have usefulness in other fields and applications.

By way of background, wireless communication networks, which are well known, allow mobile devices to communicate with each other and other networks, such as the Internet and the public switched telephone network (PSTN). First and second generation wireless telephone systems are generally constrained in the amount of bandwidth available for communication, which limits capacity and also the types of services that can be provided. Third generation (3G) wireless systems, which are being developed through the 3rd Generation Partnership Project (3GPP), include greater bandwidth, thereby increasing capacity and allowing for enhanced services, such as multimedia services.

3GPP is the new worldwide standard for the creation, delivery, and playback of multimedia over new, high-speed wireless networks. 3GPP enables the free sharing of multimedia files between a variety of devices, including cell phones, personal digital assistants (PDAs), and notebook and desktop computers. 3GPP devices include, in addition to a voice communication interface, capability for communication of data and display of data, including video.

The rise of the 3GPP has led to the development of a telecommunications network generally known as the IP multimedia subsystem (IMS). IMS is defined by IP standards that are developed by 3GPP and 3GPP2, the industry bodies responsible for determining 3G developments. The standards specify that the role of IMS is to deliver person-to-person real time IP-based multimedia communications, such as voice and video, as well as person-to-machine communications; fully integrate real time with non-real time multimedia communications; enable different services and applications to interact; and support simple user set up of multiple services in a single session or multiple simultaneous synchronized sessions. The standard has been developed to support a wide range of access mechanisms, including GSM, W-CDMA, CDMA2000, WI-FI and other wireless broad band technologies such as WIMAX as well as fixed line broadband. Further, there has been an attempt in the industry to integrate wireline and wireless networks. In this regard, there is a need to allow a peering relationship between two IMS networks (e.g., a wireline network and a wireless network) where a person is a subscriber of both networks. In other words, the person must receive the same service no matter which IMS network that person is using.

SUMMARY OF THE INVENTION

A method and system for allowing a peering relationship between multimedia networks are provided.

In one aspect of the invention there is provided a method for provisioning a peering relationship between the multimedia networks in a telecommunications system. The method comprises registering a customer with at least one of the multimedia networks; constructing the customer's mapping and routing data (including initial filter criteria) within each of the networks; synchronizing the customer's mapping and routing data between the multimedia networks; and storing the customer's mapping and routing data in a database in each of the multimedia networks.

In another aspect of the invention there is provided a network selection method in a telecommunications system including at least two multimedia networks. The method comprises receiving an invite message with an originating public user identity at a first network element in a first multimedia network; determining whether a network has already been selected. Where a network has already been selected, an invite message with the originating public user identity is sent to a second element in the first multimedia network. Where a network has not already been selected, mapping and routing data and functionality for the originating public user identity are applied to select a network and send an invite message with the appropriate public user identity based upon the mapping and routing data.

In yet another aspect of the present invention there is provided a system for allowing a peering relationship between at least two multimedia networks. The system comprises a database for storing mapping and routing data for a common subscriber to the multimedia networks; a first network element for receiving an invite message with an originating public user identity; a second network element for processing the invite message; and a network selection application server. The network selection application server is operative to determine whether a network has already been selected; send an invite message with the originating public user identity to a second element in the first multimedia network, when a network has already been selected; and apply mapping and routing data for the originating public user identity to select a network and send an invite message with the appropriate public user identity based upon the mapping and routing data, when a network has not already been selected.

Further scope of the applicability of the present invention will become apparent from the detailed description provided below. It should be understood, however, that the detailed description and specific examples, while indicating preferred embodiments of the invention, are given by way of illustration only, since various changes and modifications within the spirit and scope of the invention will become apparent to those skilled in the art.

DESCRIPTION OF THE DRAWINGS

The present invention exists in the construction, arrangement, and combination of the various parts of the device, and steps of the method, whereby the objects contemplated are attained as hereinafter more fully set forth, specifically pointed out in the claims, and illustrated in the accompanying drawings, which are briefly described below.

FIG. 8 is a flow chart showing the network selection process.

FIG. 9 is a call flow diagram illustrating the best case scenario.

DETAILED DESCRIPTION OF THE PREFERRED EMBODIMENTS

It is to be understood that the specific methods and systems illustrated in the attached drawings and described in the following specification are simply exemplary embodiments of the inventive concepts defined in the appended claims. Therefore, specific examples and characteristics related to the embodiments disclosed herein are not to be considered as limiting, unless the claims expressly state otherwise.

Figure 1:
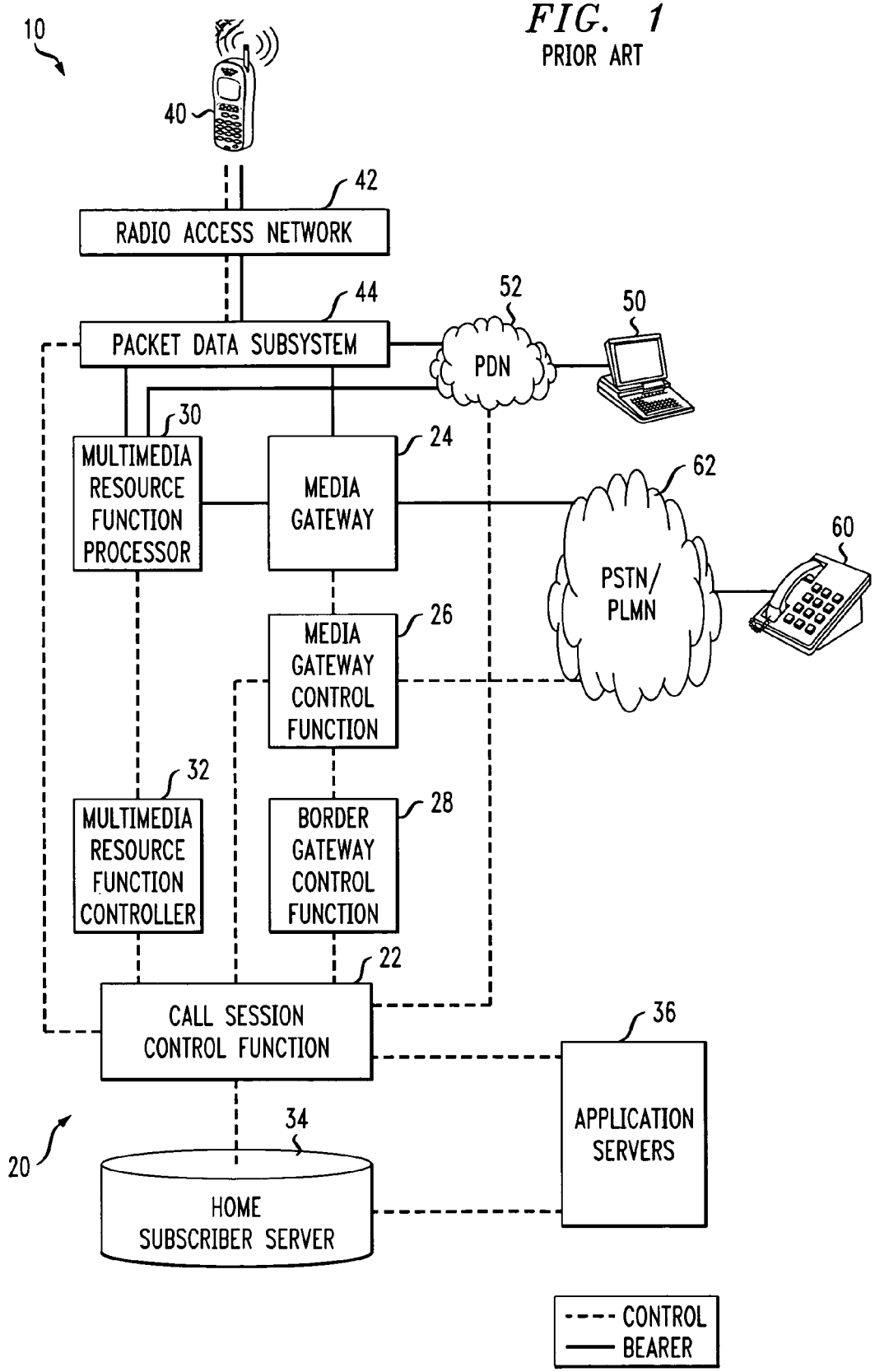
FIG. 1 is a block diagram showing a known multimedia telecommunications environment suitable for practicing aspects of the present invention.

For simplicity and ease of reference, the acronyms listed below shall be used in the specification to refer to structural and/or functional network elements, relevant telecommunications standards, protocols and/or services, terminology, etc., as they are commonly known in the telecommunications art, except to the extent they have been modified in accordance with aspects of the present invention:

3G—$3^{rd}$ Generation
3GPP—$3^{rd}$ Generation Partnership Project
3GPP2—$3^{rd}$ Generation Partnership Project 2
AH—Address Handling
AS—Application Server
BGCF—Border/Breakout Gateway Control Function
CCF—Call Control Function
CDMA—Code Division Multiple Access
CSCF—Call Session Control Function
HLR—Home Location Register
HSS—Home Subscriber Server
ICGW—Incoming Call Gateway
I-CSCF—Interrogating Call Session Control Function
IMS—IP Multimedia Subsystem
IP—Internet Protocol
MGCF—Media Gateway Control Function
MGW—Media Gateway
MRFC—Multimedia Resource Function Controller
MRFP—Multimedia Resource Function Processor
P-CSCF—Proxy Call Session Control Function
PDN—Public Data Network
PDS—Packet Data Subsystem
PLMN—Public Land Mobile Network
PSDN—Packet Switched Data Network
PSTN—Public Switched Telephone Network
PUID—Public User Identity
RAN—Radio Access Network
S-CSCF—Serving Call Session Control Function
SIP—Session Initiation Protocol
SPD—Serving Profile Database
UMTS—Universal Mobile Telecommunications System
VMS—Voicemail/Multimedia Mail Server
WLAN—Wireless Local Area Network FIG. 1 is a block diagram of a known multimedia telecommunications network 10 suitable for implementing aspects of the present invention. The multimedia telecommunications network 10 provides users with a variety of options for communication. Users are able to transmit and receive multimedia communications, including audio, voice, video, and all types of data. The multimedia telecommunications network 10 provides access to data networks, such as the Internet, and public telephone networks, including wireless networks. It is to be understood, however, that other such networks may be suitable for implementing aspects of the present invention.

The multimedia telecommunications network 10 preferably includes an IP multimedia subsystem (IMS) 20, which is known in the art: The IMS 20 relates to a technology standardized by the $3^{rd}$ Generation Partnership Project, also known as 3GPP, and is used to join mobile communication with IP technologies by adding the ability to deliver integrated voice and data services over the IP-based packet switched network. IMS services are based on the Session Initiation Protocol (SIP), which is the signaling protocol standard for next-generation 3GPP mobile wireless networks.

The IMS 20 typically includes any number of system elements, such as at least one call session control function (CSCF) 22, media gateways (MGW) 24, a media gateway control function (MGCF) 26, a border gateway control function (BGCF) 28, a multimedia resource function processor (MRFP) 30, a multimedia resource function controller (MRFC) 32, a home subscriber system (HSS) 34, and any number of application servers (AS) 36. As is known in the art, the IMS 20 manages call sessions and provides and administers packet switching for multimedia communications within the network 10.

A first communication device 40 is shown in FIG. 1. The first communication device 40 is preferably a wireless device, which includes a user interface and an interface for coupling to a radio access network (RAN) 42. The user interface of the communication device 40 is typically referred to as terminal equipment and generally includes an audio interface, such as a microphone and speakers, a visual interface, such as a display, and a user input interface, such as a keyboard or touch pad. The interface for coupling to the RAN 42 is typically referred to as a mobile terminal and generally includes an over-the-air interface for transmitting and receiving data. The over-the-air interface of the communication device 40 is used to communicate with base stations in the RAN 42. Preferably, the communication device 40 and the base stations in the RAN 42 communicate over-the-air using a packet-based protocol such as UMTS, CDMA, or IEEE 802.16. A packet data subsystem (PDS) 44 couples the RAN 42 with the IMS 20 and the public data network (PDN) 52 in the usual manner.

A second communication device 50 is shown as a laptop or notebook computer operatively connected to the IMS 20 via the PDN 52. The communication device 50 optionally employs a wireless local area network (WLAN) or wire line (e.g., DSL or Cable Modem), in the usual manner, to operatively connect to the PDN 52. A third communication device 60 is shown as an ordinary telephone equipped to handle only voice communications. The communication device 60 is operatively connected to the IMS 20 via the public switched telephone network/public land mobile network (PSTN/PLMN) 62.

Only three communication devices (40, 50, and 60) are shown in FIG. 1 for the purpose of simplifying the diagram. However, it is to be appreciated that any number of such devices and types of devices are typically situated in the multimedia telecommunications network 10. Additionally, while each is depicted as a specific type of communication device, other like devices may also be incorporated.

With continuing reference to FIG. 1, the bearer paths that carry (or relay) the communication traffic and/or user information for transmission from one terminal to another, which are known in the art, are shown as solid lines. Control paths carry associated signaling and/or control commands (or messages) to and between appropriate network elements for the purpose of managing and routing call sessions. The control paths are shown as dashed lines in FIG. 1. Suitably, SIP, RTP and other known protocols are used on the control and bearer paths, respectively. For example, the known Media Gateway Control Protocol ITU-T H.248 protocol is suitably employed for media gateway control. The CSCF 22, the BGCF 28, the MGCF 26, the MRFC 32 and the AS 36 comprise the call control and signaling functionality for the IMS 20, while the bearer paths interface with the MRFP 30 and the MGW 24 to provide and support interconnectivity to external networks and/or subsystems, such as the PDS 44, the PDN 52 and the PSTN/PLMN 62.

The CSCF 22 supports and controls multimedia sessions. The CSCF 22 invites elements such as the MGCF 26 and the MRFC 32 to call sessions to control the establishment and maintenance of bearer paths for call sessions by adding, modifying or deleting appropriate bearer paths for respective call sessions. The CSCF 22 is the signaling entity for call session control. It manages sessions by using SIP and/or other appropriate call/session establishment protocols, and it provides features and services and coordinates with other network elements for session control, service control and resource allocation.

Thus, the CSCF 22 may provide the following functionalities: incoming call gateway (ICGW), call control function (CCF), serving profile database (SPD), and address handling (AH). By functioning as an ICGW, the CSCF 22 acts as a call session entry point and routes incoming calls. The CCF generally refers to call setup/termination and state/event management. The CSCF 22 interacts with the MGCF 26 for calls to/from the PSTN/PLMN 62 and with the BGCF 28 for calls to the PSTN/PLMN 62 to determine the appropriate MGCF 26 to use. It also controls the MRFP 30 via the MRFC 32, which interprets information or signals coming from the CSCF 22 and controls the MFRP 30, in order to support conferencing and other multi-party services. SIP level registrations from subscribers are processed with the CCF. The CSCF 22 may also provide service trigger mechanisms to the AS 36 to invoke services provided thereby, either locally, at the AS 36, or elsewhere. It also reports call events for billing, auditing, intercept or other purposes, and may query the AH function to check whether a requested communication is allowed given the current subscription. The SPD function refers to the interaction of the CSCF 22 with the HSS 34 to receive and cache user profile information. The AH function refers to address analysis, translation, modification (when appropriate) and mapping.

The MGW 24 acts as a bearer path interface between different transport networks, and provides translation resources and resources for modifying the bearer stream (e.g., encoding, transcoding, compression, packetization, depacketization, etc.). The bearer path control elements include the MGCF 26 and the MRFC 32. These elements provide the flexibility to control the bearer by adding, modifying or deleting bearers on the MGW 24/MRFP 30 respectively that are used by the users' services. More particularly, the MGW 24 interacts with the MGCF 26, which interprets signaling coming from the CSCF 22 and controls the MGW 24 to achieve resource allocation, bearer path control, and payload processing. The MGCF 26 communicates with the CSCF 22 in order to control the call state for media channels on one or more MGWs and performs conversions between Legacy and 3G Universal Mobile Telecommunications System (UMTS)/Code Division Multiple Access (CDMA) network call control protocols. Similarly, the MRFC 32 controls the media stream resources in the MRFP 30, which also acts as a bearer path interface between the IMS 20 and external networks and/or subsystems, while being able to provide for conferencing or multiple party communications or other more advanced media services (relative to the MGW 24). The BGCF 28 selects the proper MGCF 26.

The HSS 34 is coupled to the CSCF 22 via a data link. The HSS 34 includes subscriber profile information, including information traditionally associated with a home location register (HLR) for a mobile subscriber. Suitably, the HSS 34 stores information such as user identification, user security information, including network access control information for authentication and authorization, user location information for user registration and locating, and user profiles, including identification of the services subscribed to and other service specific information. The Initial Filter Criteria—the rules for what application to access and in what order—is stored in the HSS 34.

The AS 36 is preferably coupled to the IMS 20 for use in interaction with the communication devices 40, 50, 60. In particular, the CSCF 22 is coupled to the AS 36 via a data link. Also, the HSS 34 is preferably coupled to the AS 36. A myriad of services and applications may reside in or be coupled to the AS 36, as will be described later.

In the IMS 20 a public user identity (PUID) uniquely identifies a certain user. At the same time, several such PUIDs may well be registered in the IMS 20 for one and the same user. The user identifier PUID which is formed of or represented by a TEL-URL (Telephone Uniform Resource Locator) or a SIP-URI (Session Initiation Protocol Uniform Resource Identifier) is comparable in terms of its format with the format of a known e-mail address. One or more PUIDs may be assigned statically (i.e., permanently) to the respective user by the respective network operator in the IMS 20 and stored there.

The CSCF 22, the MGCF 26, the MGW 24, the HSS 34, and the AS 36 are typically processor-based devices with data link interfaces for coupling together as described above and shown in FIG. 1. These devices typically include one or more processors that execute programs to implement the functionality described herein and generally associated with 3GPP/3GPP2 wireless systems. The flexibility of these processor-based systems permits ready integration into these systems of a peering relationship method and system in accordance with the present invention. It should be noted, however, that as utilized herein, the term "processor" is not intended to refer exclusively to hardware capable of executing software.

Figure 2:
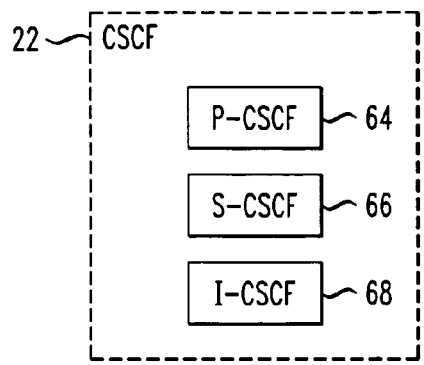
FIG. 2 is a simplified block diagram illustrating the CSCF shown in FIG. 1.

With reference now to FIG. 2, to fulfill the functionalities described earlier, the CSCF 22 can act as Proxy CSCF (P-CSCF) 64, Serving CSCF (S-CSCF) 66 or Interrogating CSCF (I-CSCF) 68. The Proxy-CSCF (P-CSCF) 64 is the first contact point within the IMS network. The P-CSCF 64 behaves like a Proxy, accepting requests and services them internally or forwards them on. The P-CSCF 64 may behave as a User Agent, i.e. in abnormal conditions it may terminate and independently generate SIP transactions. The Interrogating-CSCF (I-CSCF) 68 is the contact point within an operator's network for all connections destined to a subscriber of that network operator, or a roaming subscriber currently located within that network operator's service area. There may be multiple I-CSCFs 68 within an operator's network. The Serving-CSCF (S-CSCF) 66 performs the session control services for the endpoint. It maintains session state as needed by the network operator for support of the services. Within an operator's network, different S-CSCFs 66 may have different functionality.

Figure 3:
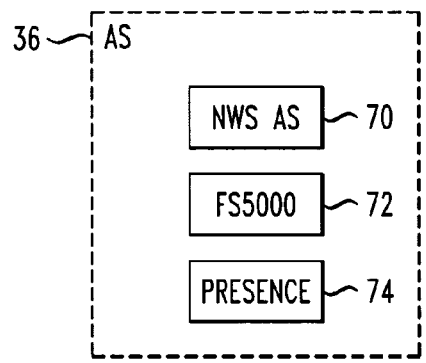
FIG. 3 is a simplified block diagram illustrating the types of application servers that may be included in the telecommunications environment shown in FIG. 1.

As shown in FIG. 3, the AS 36 may comprise, for example, a network selection application server (NWS AS) 70, a basic telephony server 72, such as an FS5000, and a presence server 74. The NWS AS 70 includes logic to determine which network to deliver the session to, based upon mappings between different PUIDs for a subscriber, presence, subscriber rules, and general rules, all of which will be described in greater detail below.

Figure 4:
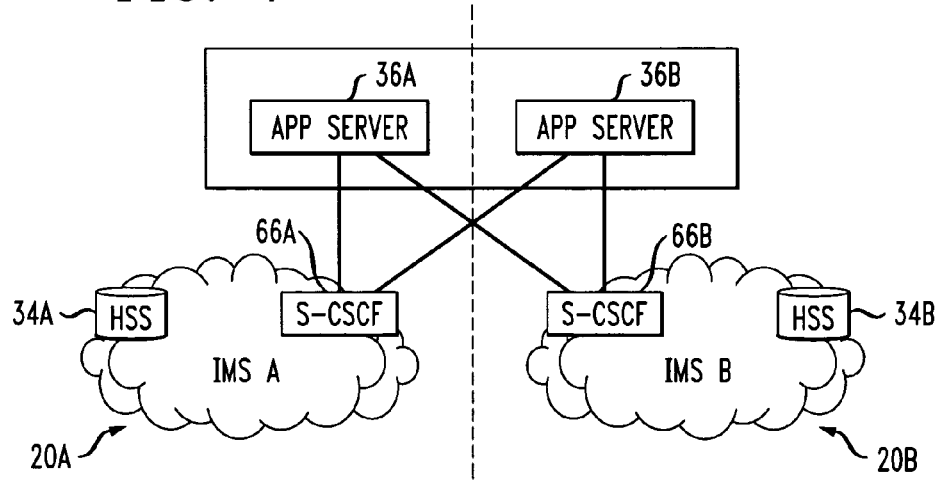
FIG. 4 is a block diagram showing two IMS networks with a peering relationship according to aspects of the present invention.

FIG. 4 illustrates a pair of IMS networks 20A and 20B that are to be integrated according to the present invention. Of course, it is to be understood that there may be more than two IMS networks involved. The IMS networks 20A and 20B may be any suitable types of IMS networks such as wireless, DSL, WI-FI, cellular data, etc. Thus, each of the IMS networks 20A and 20B includes at least one AS 36, HSS 34, and S-CSCF 66. The AS 36A of the first network 20A interfaces with the S-CSCFs 66A and 66B in both networks 20A and 20B. Likewise, the AS 36B of the second network 20B interfaces with the S-CSCFs 66A and 66B in both networks 20A and 20B. Applications are built to use a SIP interface when working with both networks.

Figure 5:
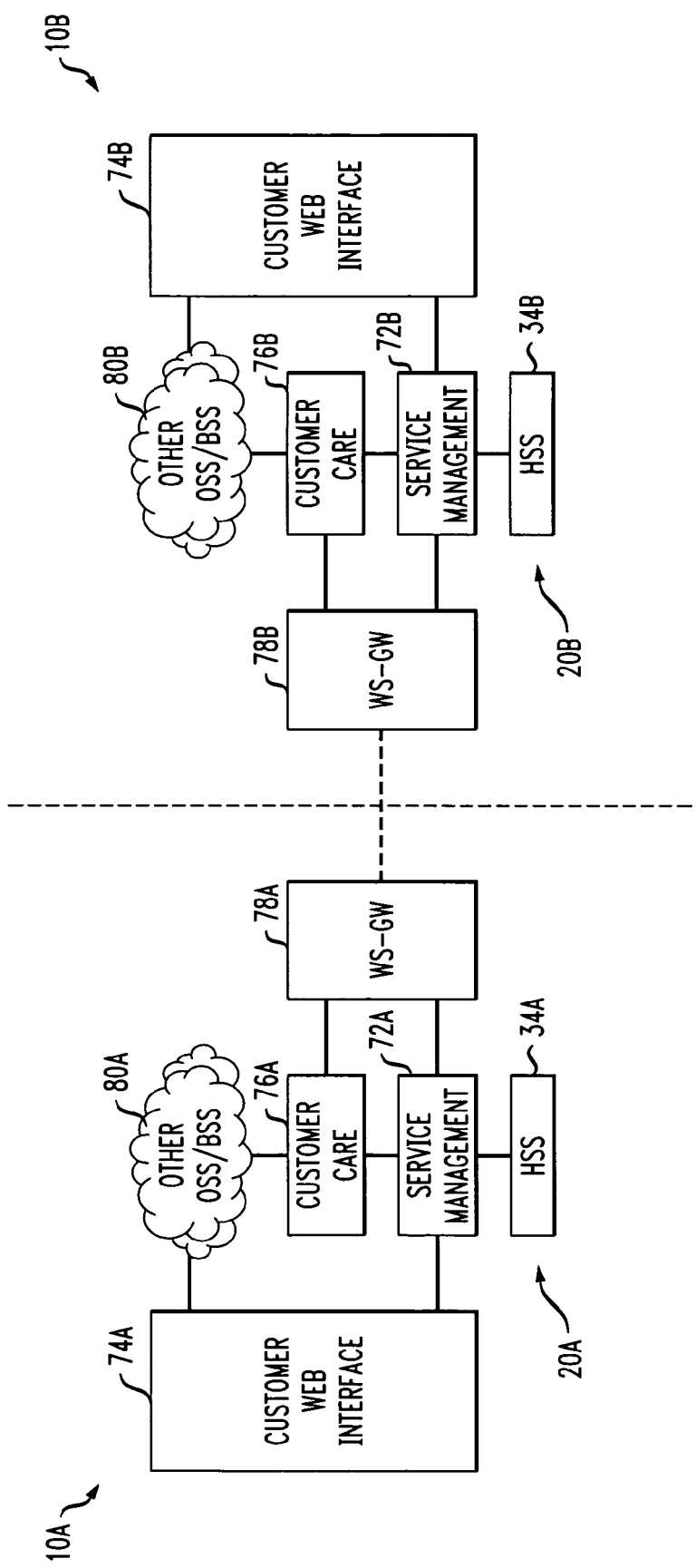
FIG. 5 is a block diagram illustrating the set-up procedure for a subscriber to allow a peering relationship between two IMS networks.

FIG. 5 helps to illustrate the provisioning procedure for a peering relationship between a first IMS network 20A (only the HSS 34A is shown for simplicity) in a first network 10A and a second IMS network 20B (only the HSS 34B is shown for simplicity) in a second network 10B for a customer. These two networks 10A and 10B include additional functionality, which may or may not be part of the respective IMS networks 20A and 20B. Thus, for example, a customer may be registered with a first service (e.g., DSL) and a second service (e.g., wireless). The customer may initiate communication with a service management entity 72A in the first network 10A via a standard Web interface 74A. In turn, service management 72A is linked to customer care 76A, the HSS 34A, and a WS-GW (Web Services Gateway) 78A. Customer care 76A communicates with other OSS/BSS (Operating Support Systems/Business Support Systems) 80A. The first WS-GW 78A communicates directly with the corresponding WS-GW 78B of the second network 10B, relaying the particular application(s) and ordering that a customer subscribes to. Likewise, the customer may initiate communication with the service management entity 72B of the second network 10B and so on.

Each IMS network (20A and 20B) then constructs the Initial Filter Criteria (IFC) for that subscriber, which contains the same applications and ordering as the peer network with the exception of the NWS AS 70 for its particular network, which is placed first in the list of criteria for terminating calls. For applications applied on the originating side of the session, the NWS AS 70 would not be included for those criteria. The updated IFC are then loaded in the HSS 34. Thus, there is a symmetric relationship between the two carriers for subscribers to both services. That is, the same functionality (provided by application servers 36 and routing functionality) can be provided for such users regardless of whether they are attached to the first network 20A or to the second network 20B and if a terminating communications session is delivered to one network or the other. The IFC are essentially equivalent for a subscriber in both networks.

An alternate implementation would have the two networks 20A and 20B construct similar IFC where the common services are combined with services that a customer has in one network or the other. For example, let us assume that the first network 20A is wireless and the second network 20B is wireline. If the customer has a video terminal on the wireless network 20A and an analog telephony adaptor on the wireline network 20B, then the IFC for the wireless network 20A might include a video application. The Service Management entity 72 would detect this condition and construct a different IFC. There may be alternative implementations where not all the components are used. For example: not having the customer Web interface 74, or customer care 76, or even the WS-GW 78. The end result is that essentially the same IFC for a subscriber is constructed in both networks.

Figure 6:
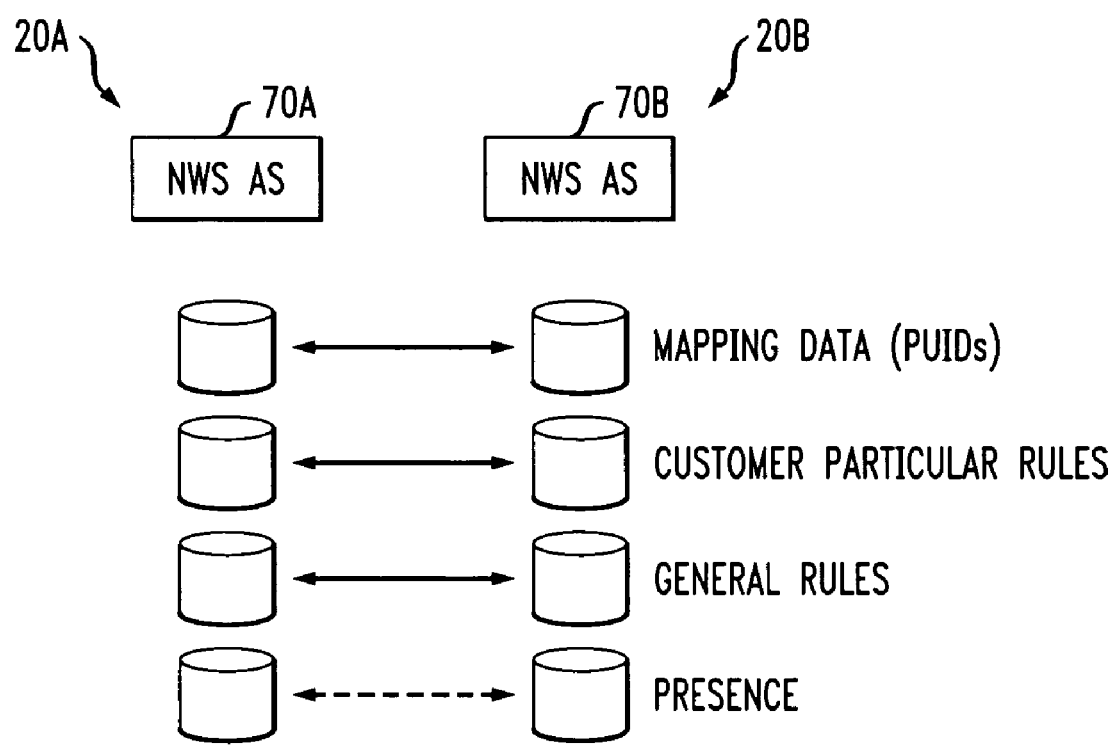
FIG. 6 is a block diagram illustrating the synchronization of network selection application servers across IMS networks.

Along with constructing essentially equivalent IFC, the two networks exchange additional mapping and routing data such as PUIDs, customer particular rules and general rules for operation of the NWS AS 70. Thus, as illustrated in FIG. 6, the NWS AS 70 of the two IMS networks 20A and 20B are synchronized for common subscribers. In this regard, the following parameters, among others, may be synchronized: mapping data (e.g., PUIDs), customer particular rules (i.e., the rules that are set by the customer), general rules (i.e., the rules that are set by the network operator(s)) and presence information on which (if any) of the networks the subscriber is currently registered (synchronized in real-time when needed).

Figure 7:
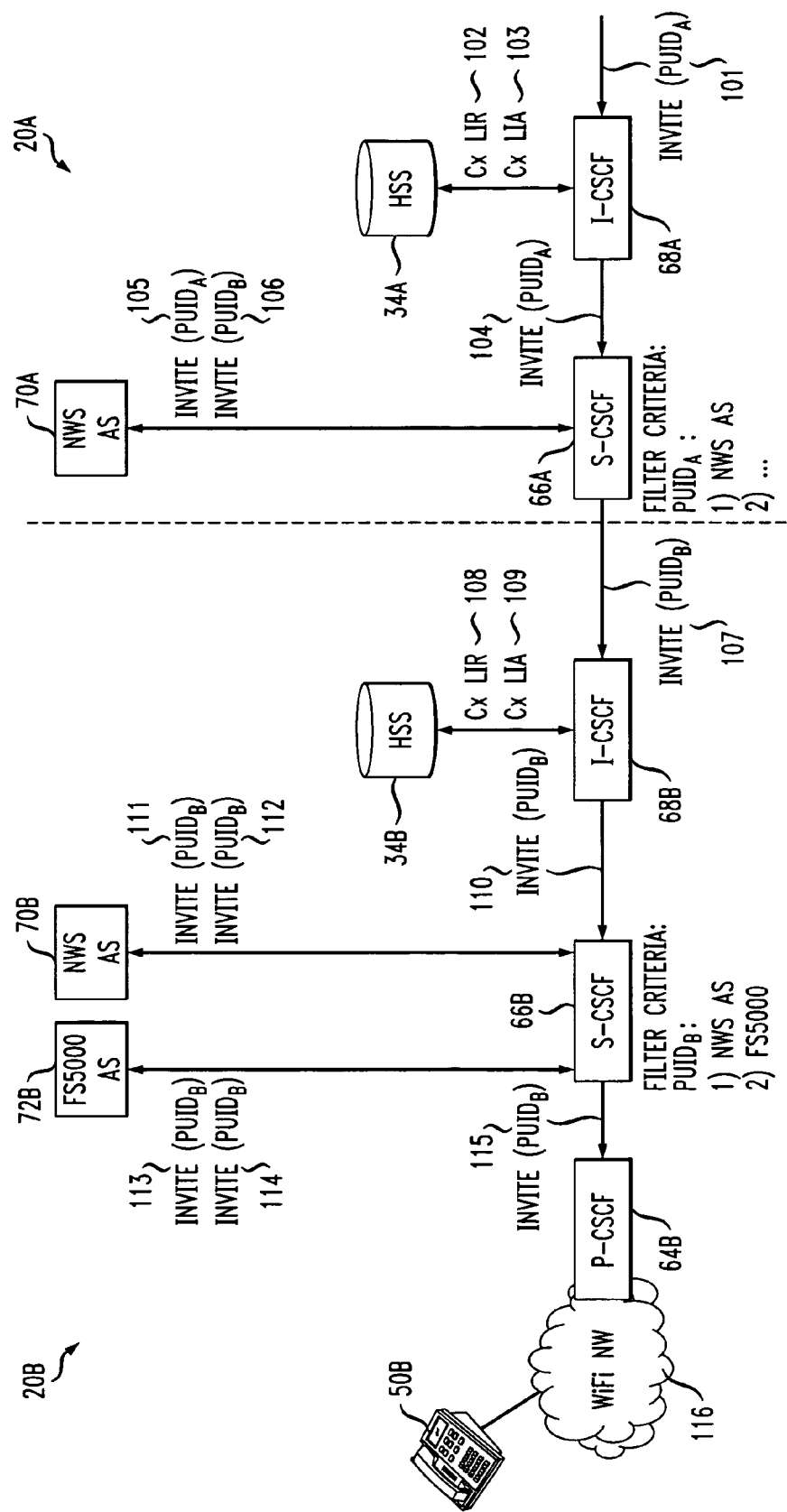
FIG. 7 is a call flow diagram illustrating the worst case scenario.

To illustrate the operation of the present invention, let us assume that a subscriber is shared between a pair of IMS networks 20A and 20B. FIG. 7 represents the call flow for the "worst case scenario" where a session request enters one network (20A in this case), and is delivered to the other network (20B). In step 101, an INVITE message with the customer's PUID (i.e., $PUID_A$ in this example) for the first network 20A (perhaps originating as a voice call) is sent to the I-CSCF 68A of the first IMS network 20A. The I-CSCF 68A sends a location information request (LIR) to the HSS 34A (step 102), and the HSS 34A responds with a location information acknowledgement (LIA) (step 103) indicating 66A as the S-CSCF. Next, the I-CSCF 68A sends an INVITE message (with $PUID_A$) to the S-CSCF 66A (step 104). At this point, the S-CSCF 66A sends an INVITE message (with $PUID_A$) to the NWS AS 70A (step 105) based upon the initial filter criteria for $PUID_A$.

Turning now to FIG. 8, which shows the network selection process for a given application as made by the NWS AS 70A. First, a determination is made as to whether network selection has already been made (step 201). If network selection has already been done (e.g., by the other IMS network 20B), then the same PUID (i.e., $PUID_A$ in this example) will be used in the SIP header (step 202) when sending the INVITE message back to the S-CSCF 66A (step 203). However, if network selection has not already been done, then presence information is accessed (step 204) using a known mechanism such as SIP/SIMPLE or OSA Gateway APIs. Further, the general rules are accessed (step 205). Some examples of "general rules" include: (a) if the subscriber is present on only one network then the subscriber is served by that network, (b) if the subscriber is registered with both networks and the call originated on the first network 20A, then the subscriber is served by that network, and (c) if the subscriber is not registered on either network, then the subscriber is served by the network the call is initially delivered to. If any of the general rules are applicable, then an INVITE message is sent to the S-CSCF 66A (step 206). If none of the general rules are applicable, then customer particular rules are accessed (step 207). Some examples of "customer rules" include: (a) if both the subscriber's mobile and PC phones are on, then route the call to the network serving the mobile phone, and (b) if the call occurs between 9:00 a.m. and 5:00 p.m., then route the call to the network serving the subscriber's PC phone, otherwise route the call to the network serving the subscriber's mobile phone. There is a default rule such that if any of the other rules have not fired then one of the networks is selected. If any of the customer particular rules are applicable, then an INVITE message is either continued to be processed at the current S-CSCF 66A or sent to the S-CSCF 66B (via the I-CSCF 68B) of the other network 20B (step 208). The mechanism to route to the other network is for the NWS AS 70 to return a SIP INVITE using one of the PUIDs (determined by the rules described above) of the other network. An alternate implementation would have a different ordering of above steps 205 and 207. For purposes of this example, let us assume that the network selection process has determined that the session is to be delivered to the second network 20B.

Returning now to the call flow in FIG. 7, the appropriate INVITE message (with $PUID_B$ in this example) is sent to the I-CSCF 68B in the second network 20B (step 107) as explained above. Next, a location information request is sent to the HSS 34B (step 108), which responds with the location information acknowledgement (step 109). The I-CSCF 68B then sends an INVITE message to the S-CSCF 66B (step 110). The S-CSCF 66B applies the initial filter criteria and determines that the first application server to be involved in the signaling is the NWS AS 70B. The S-CSCF 66B then sends an INVITE message (with $PUID_B$) to the NWS AS 70B, which responds with the appropriate INVITE message (with $PUID_B$) (step 112). The S-CSCF 66B then again uses the filter criteria for $PUID_B$ to determine where to route the SIP INVITE, in this case, the FS5000 (basic telephony) AS 72B (steps 113 and 114). Finally, after all the application servers 36 that meet the criteria are exhausted, then the INVITE message (with $PUID_B$) is routed to the P-CSCF 64B (step 115). The P-CSCF 64B then routes the message to the communications device 50B (step 116).

FIG. 9 shows a "best case scenario" for the peering relationship between a pair of IMS networks 20A and 20B where a session request enters one network (20A in this case), and is delivered on that same network (20A). As shown in FIG. 9, an INVITE message (with $PUID_A$) is sent to the I-CSCF 68A (step 301). The I-CSCF 68A communicates with the HSS 34A as described above. Thus, a location information request is sent to the HSS 34A (step 302), which responds with a location information acknowledgement (step 303). The I-CSCF 68A sends an INVITE message (with $PUID_A$) to the S-CSCF 66A, which applies the appropriate initial filter criteria resulting in the address of NWS AS 70A (step 304). The S-CSCF 68A communicates with the NWS AS 70A by sending an INVITE message (with $PUID_A$) (step 305). The NWS AS 70A then applies the network selection process of FIG. 8 and responds with the appropriate INVITE message (in this case, with $PUID_A$) (step 306). The S-CSCF 66A then sends an INVITE message (with $PUID_A$) to the basic telephony AS 72A (step 307), which responds with the appropriate INVITE message (with $PUID_A$) (step 308). Next, the S-CSCF 66A sends an INVITE message (with $PUID_A$) to the P-CSCF 64A (step 309). The P-CSCF 64A then routes the message to the communications device 40A (step 310).

The routing of originating calls uses normal IMS mechanisms that include the Initial Filter Criteria (IFC) generated in FIG. 5.

The above description merely provides a disclosure of particular embodiments of the invention and is not intended for the purposes of limiting the same thereto. As such, the invention is not limited to only the above-described embodiments. Rather, it is recognized that one skilled in the art could conceive alternative embodiments that fall within the scope of the invention. For example, the embodiments described above may be applied to telecommunications networks including more than two multimedia networks.

We claim:

1. In a telecommunications system including at least two multimedia networks, a method for provisioning a peering relationship between the multimedia networks, the method comprising:
   registering a customer with at least one of the multimedia networks;
   constructing the customer's initial filter criteria for both originating and terminating calls that is essentially equivalent within each of the networks, wherein the initial filter criteria for a particular network contains the same applications and ordering as its peer network with the exception of a network application selection server for the particular network that is placed first in a list of criteria for terminating calls;
   synchronizing the customer's additional mapping and routing data between the multimedia networks; and
   storing the customer's synchronized initial filter criteria and additional mapping and routing data in a database in each of the multimedia networks.

2. The method defined in claim 1, wherein the additional mapping and routing data comprises at least one of, public user identity (PUID) mapping data, customer particular rules, general rules, and presence information.

3. The method defined in claim 1, wherein each multimedia network includes at least one of a customer care entity, a service management entity, and a web services gateway.

4. The method defined in claim 1, wherein each of the multimedia networks comprises an IP Multimedia Subsystem.

5. The method defined in claim 4, wherein each of the databases comprises a home subscriber server.

6. The method defined in claim 5, wherein the additional mapping and routing data comprises at least one of initial filter criteria, PUID mapping data, customer particular rules, general rules, and presence information.

7. The method defined in claim 6, wherein each multimedia network includes at least one of a customer care entity, a service management entity, and a web services gateway.

8. In a telecommunications system including at least two multimedia networks with a peering relationship between the multimedia networks, a network selection method comprising:
   receiving an invite message with an originating public user identity at a first network element in a first multimedia network;
   determining whether a network has already been selected;
   where a network has already been selected, sending an invite message with the originating public user identity (PUID) to a second element in the first multimedia network; and
   where a network has not already been selected, applying mapping and routing data for the originating public user identity to select a network and sending an invite message with the appropriate public user identity based upon the mapping and routing data, wherein the mapping and routing data comprises initial filter criteria and at least one of PUID mapping data, customer particular rules, general rules, and presence information, wherein the initial filter criteria for a particular network contains the same applications and ordering as its peer network with the exception of a network application selection server for the particular network that is placed first in a list of criteria for terminating calls.

9. The method defined in claim 8, wherein each of the multimedia networks comprises an IP Multimedia Subsystem.

10. The method defined in claim 9, wherein each of the databases comprises a home subscriber server.

11. A system for allowing a peering relationship between at least two multimedia networks, the system comprising:
- a database for storing mapping and routing data for a common subscriber to the multimedia networks;
- a first network element for receiving an invite message with an originating public user identity;
- a second network element for processing the invite message; and
- a network selection application server operative to:
  - determine whether a network has already been selected;
  - send an invite message with the originating public user identity to a second element in the first multimedia network, when a network has already been selected; and
  - apply mapping and routing data for the originating public user identity (PUID) to select a network and send an invite message with the appropriate public user identity based upon the mapping and routing data, when a network has not already been selected, wherein the mapping and routing data comprises initial filter criteria and at least one of PUID mapping data, customer particular rules, general rules, and presence information, wherein the initial filter criteria for a particular network contains the same applications and ordering as its peer network with the exception of a network application selection server for the particular network that is placed first in a list of criteria for terminating calls.

12. The system defined in claim 11, wherein each of the multimedia networks comprises an IP Multimedia Subsystem.

13. The system defined in claim 12, wherein each of the databases comprises a home subscriber server.

14. The system defined in claim 13, wherein the first network element comprises an I-CSCF.

15. The system defined in claim 14, wherein the second network element comprises an S-CSCF.

* * * * *